(12) United States Patent
Fallon et al.

(10) Patent No.: US 7,703,046 B2
(45) Date of Patent: Apr. 20, 2010

(54) USER INTERFACE PROVIDING UPS INFORMATION

(75) Inventors: Raymond Fallon, Fort Lorenzo (IE); T. Noel Fegan, Knocknacarra (IE); David Mathieson, Headford (IE); Jacqueline Hayes, Lackagh (IE)

(73) Assignee: American Power Conversion Corporation, West Kingston, RI (US)

( * ) Notice: Subject to any disclaimer, the term of this patent is extended or adjusted under 35 U.S.C. 154(b) by 349 days.

(21) Appl. No.: 10/042,910

(22) Filed: Jan. 9, 2002

(65) Prior Publication Data

US 2003/0132949 A1 Jul. 17, 2003

(51) Int. Cl.
*G06F 3/00* (2006.01)
(52) U.S. Cl. .................. 715/861; 715/736; 715/764; 715/825; 715/859
(58) Field of Classification Search .......... 345/770, 345/211, 212; 713/340; 717/176; 715/770, 715/750, 736, 735, 764, 825, 859, 861
See application file for complete search history.

(56) References Cited

U.S. PATENT DOCUMENTS

| | | | | |
|---|---|---|---|---|
| 5,479,599 | A | 12/1995 | Rockwell et al. ............ 715/837 |
| 5,751,965 | A | 5/1998 | Mayo et al. ................. 709/224 |
| 5,764,913 | A | 6/1998 | Jancke et al. ............... 709/224 |
| 5,802,383 | A | 9/1998 | Li et al. ...................... 345/420 |
| 5,825,656 | A | 10/1998 | Moore et al. ................. 702/60 |
| 5,958,012 | A | 9/1999 | Battat et al. ................ 709/224 |
| 5,961,604 | A | 10/1999 | Anderson et al. .......... 709/229 |
| 6,229,538 | B1 | 5/2001 | McIntyre et al. ............ 715/734 |
| 6,269,398 | B1 | 7/2001 | Leong et al. ................ 709/224 |
| 6,271,845 | B1 | 8/2001 | Richardson ................. 715/764 |
| 6,456,306 | B1 | 9/2002 | Chin et al. .................. 715/810 |
| 6,618,163 | B1 | 9/2003 | Roosen et al. ............ 358/1.15 |
| 6,865,685 | B2* | 3/2005 | Hammond et al. .......... 713/340 |
| 2002/0129355 | A1* | 9/2002 | Velten et al. ................ 717/176 |
| 2002/0184361 | A1 | 12/2002 | Eden ........................ 709/224 |
| 2003/0011647 | A1 | 1/2003 | Abbondanzio et al. ...... 345/853 |
| 2003/0033550 | A1* | 2/2003 | Kuiawa et al. .............. 713/340 |
| 2003/0085624 | A1 | 5/2003 | Kadoi et al. .................. 307/64 |

FOREIGN PATENT DOCUMENTS

WO WO 98/55934 12/1998

OTHER PUBLICATIONS

U.S. Appl. No. 60/272,664.*
Jarkowski, M. et al., "New approach for management services with a Web browser", Computer Networks, vol. 31, No. 21 (Nov. 1999), pp. 2227-2236.
Daishoji, H. et al., "A compact uniterruptible power system, SAU series", Database Inspec/IEE, Database accession No. 5859337, vol. 29, No. 1, p. 1.
"A Software Managing Clustered Multi Vender Uninteruptible Power Supply on Network", Research Disclosure, vol. 42, No. 419 (Mar. 1999), pp. 1-6.

* cited by examiner

*Primary Examiner*—Weilun Lo
*Assistant Examiner*—Mylinh Tran
(74) *Attorney, Agent, or Firm*—Townsend and Townsend and Crew LLP

(57) ABSTRACT

A system and method are provided for notifying a user about the occurrence of at least one predetermined event associated with an uninterruptible power supply (UPS) in operable communication with the system. The system comprises a worker module and a user interface module. The worker module determines whether the predetermined event has occurred and, responsive to said determination, the user interface module generates an user interface providing information relating to an operating parameter of the UPS. The user interface comprises at least one of a graphical portion and an alphanumeric portion.

35 Claims, 13 Drawing Sheets

USER INTERFACE PROVIDING UPS INFORMATION

FIELD OF THE INVENTION

Embodiments of the invention generally relate to devices, systems, and methods for displaying information on a computer relating to an uninterruptible power supply (UPS). More particularly, the invention relates to systems and methods for providing a user interface that displays at least one element representing context sensitive characteristics of the UPS, such as backup battery information.

BACKGROUND OF THE INVENTION

Many battery-powered computing devices, such as laptop personal computers (PC's), include power management software programs that allow the user of the device to monitor the battery power for these devices. For example, some power management software products can provide "on screen" displays indicating, for example, the levels of battery charge and battery current, or the time remaining on battery. These features are important to users who want to save data before power is lost or who want to be aware when particular actions (such as accessing a CD-ROM) increase the power usage.

For users of computing devices that use sources of power other than batteries (e.g., commercial electric power), power management and monitoring can still be important. Many computing devices are operably coupled to backup power sources such as uninterruptible power supplies (UPS's). An uninterruptible power supply (UPS) is a type of power supply used to power and protect an electrical load that is sensitive to fluctuations in or the absence of electrical power. The UPS can be connected between the load and a source of electrical power, such as a main power source or other commercially provided electric power. The UPS uses commercially supplied AC power to charge a DC battery and provide the AC power to load. Upon outages of power, the load draws its AC power from the DC battery through a DC to AC inverter. This isolates the load from power surges or brownouts and also furnishes a source of power during brief outages.

UPS devices are commonly connected to devices such as personal computers, to protect the personal computer from power fluctuations, to provide the computer user with backup power should the primary power source be lost, and to enable the computer user to "gracefully" shut down applications that are running, as the backup power is depleted. Use of UPS devices has become especially desirable in areas, such as California, where brief power outages (e.g. "rolling blackouts") sometimes occur, and in many other areas at times of the year (e.g., summer) when peak power demands are so high that power quality is affected (such as by brownouts).

As use of UPS devices has become more widespread, users frequently want to know information about the status of their UPS while it is supplying battery power. Users may also want to know whether power outages or other power-related conditions have occurred at times when the computing device was unattended. This information can, for example, be displayed to the user via information displayed on a computer screen. Some presently available UPS power management software provides such information using an icon representing the UPS on the screen. For example, in computers running a WINDOWS operating system (such as WINDOWS 95, 98, NT, and 2000), available from Microsoft Corporation of Redmond, Washington, the "systray" can include an icon representing a UPS.

The "systray" (also known as the "system tray") is a section of the taskbar in the MICROSOFT WINDOWS desktop user interface that is used to display icons (e.g., icons representing programs) so that a user is continually reminded that they are there and can click on one of them easily. The icons in the systray also can provide a user with the status of a program, such as when an "envelope" icon appears indicating to a user that the user's electronic mail program has received a new message.

Because such icons are very small, it is difficult to convey all relevant information to the user quickly and in one place. Thus, some manufacturers provide separate, full applications enabling a user to obtain additional information about the user's UPS. For example, one presently available product allows the user to view UPS data via an application window that must be manually opened by the user to view or configure UPS data and settings. The application window is not automatically displayed when special UPS conditions arise. Also, displaying the application window requires that, the user start and run a new, full application, which can interrupt the user's normal use of the computer. Because this can be inconvenient for the user, many users do not run the separate application and, consequently, do not learn the additional information about their UPS that they may need to know.

SUMMARY OF THE INVENTION

The invention provides systems and methods for notifying a user about the operation of an uninterruptible power supply (UPS), including notifications relating to specific events, such as loss of primary power to the system or fluctuations in power level which can lead to the UPS transitioning to "on battery", changes in communication with the UPS (e.g., loss of communications and/or restoration of communications), problems with UPS current, voltage, power, or other parameters, and the like. In at least one embodiment of the invention, these notifications are provided, upon occurrence of a specific event, by displaying a user interface on the display screen of a computer, so that a user can receive information about the event and/or the UPS operation. At least some systems and methods of the invention may be useful to users of computers that are operably connected to UPS devices.

In one embodiment, the invention provides a system for providing information about the occurrence of at least one predetermined event associated with an uninterruptible power supply (UPS) in operable communication with the system. The predetermined event can, for example, relate to the UPS communications status and/or the UPS battery status. The system comprises a worker module and a user interface module. The worker module determines whether the predetermined event has occurred. The user interface module is responsive to the determination of the worker module and generates a user interface providing information relating to the predetermined event. The user interface comprises at least one of a graphical portion and an alphanumerical portion. For example, the user interface can be a UPS status monitor, a system tray icon, an event notifier, and/or a balloon notifier. The user interface, in one embodiment, can include a control that enables a user to perform a function based on the displayed information. The displayed information can include context-sensitive and/or event-specific information relating to an operating parameter of the UPS.

At least some embodiments of the invention can be used to provide information about events such as receipt of a predetermined command, loss of primary power, UPS transitioning to "on battery", UPS transitioning from "on battery", change in UPS communication status, battery disconnected/connected, battery replacement due, data saving/hibernation threshold reached, shutdown started, UPS not present, UPS self test status, UPS overload status, UPS runtime status, UPS runtime purchase; UPS communication restored, UPS current status, UPS voltage status, UPS power status, and charger failure.

In addition, at least some embodiments of the invention can provide information about UPS operating parameters such as UPS current, UPS voltage, UPS battery level, UPS time remaining, UPS power remaining, battery charge, shutdown time, alarm status, "on-battery" status, history of predetermined events, UPS status, line current status, communications status, error status, and self-test status.

In at least one embodiment, the system includes a memory for storing information relating to the predetermined event and/or the operating parameter of the UPS. In some embodiments, the user interface module can displays the user interface upon occurrence of the predetermined event and for the duration of the predetermined event and/or upon receipt of a command from a user. In at least one embodiment, the worker module monitors the operating parameter of the UPS and the user interface module dynamically updates at least a portion of the user interface to reflect a change in the operating parameter. In at least one embodiment, the worker module receives information from the UPS relating to an operating parameter of the UPS.

The user interface, in at least one embodiment, is sized so that it can be viewed on a portion of a computer display. For example, in one embodiment, the user interface has a size substantially similar to the size of a toolbar. In at least one embodiment, the user interface is sized so that it can convey information to a user "at a glance" and so that it takes up minimal screen space. One advantage of this approach is that the user can run other programs while still monitoring UPS status information.

In another aspect, the invention provides a method for providing a notification about the operation of a UPS connected to a computer system. For example, the method may be used, in one embodiment, in computer systems that include a processor and a display and which are connectable to a UPS. A determination is made that a first condition relating to the UPS has occurred. Upon occurrence of the first condition, such as a change in UPS communication status, change in UPS battery status, and/or receipt of a command, a user interface is displayed, the user interface having an indicator capable of conveying UPS information. The indicator comprises at least one of a graphical image and a character image. The indicator can stop being displayed upon occurrence of a second condition, such as receiving a second command, cessation of the first condition, and/or change in the first condition.

In another embodiment, the invention provides a method for providing a user, when an event occurs, with information relating to the operation of an uninterruptible power supply (UPS), the UPS having an operational status. When it is determined that an event has occurred, a user interface is displayed that provides event-specific information about the operational status of the UPS. The user interface comprises at least one of a graphical indicator and a non-graphical indicator. The displayed operational status information is updated if the information related to the operational status of the UPS changes during the time that the event is occurring. In one embodiment, an alarm is provided to the user during the duration of the event, the alarm notifying the user that the event has occurred. In one embodiment, a control can be displayed (for example, by providing a control as part of the user interface) that enables the alarm to be muted.

In another embodiment, the invention provides a system for notifying a user about the occurrence of at least one event associated with an uninterruptible power supply (UPS), the event having a duration. The system comprises means for determining when the event has occurred and means for generating a user interface when the event occurs, the user interface providing information about the UPS during at least the duration of the predetermined event and comprising at least one of a graphical image and a textual image.

In another embodiment, the invention provides a computer program product comprising a computer useable medium and computer readable code embodied on the computer useable medium for providing information about the status of an uninterruptible power supply (UPS) during an event, the UPS having at least one operational parameter. The computer readable code comprises computer readable program code devices configured to cause a computer to effect a determination that the event has occurred and computer readable program code devices configured to cause the computer to effect the generating, upon occurrence of the event, of a user interface conveying information about the UPS operational parameter, the user interface comprising at least one of a graphical indicator and an alphanumeric indicator.

Details relating to this and other embodiments of the invention are described more fully herein.

BRIEF DESCRIPTION OF THE FIGURES

The advantages and aspects of the present invention will be more fully understood in conjunction with the following detailed description and accompanying drawings, wherein.

Figure 1:
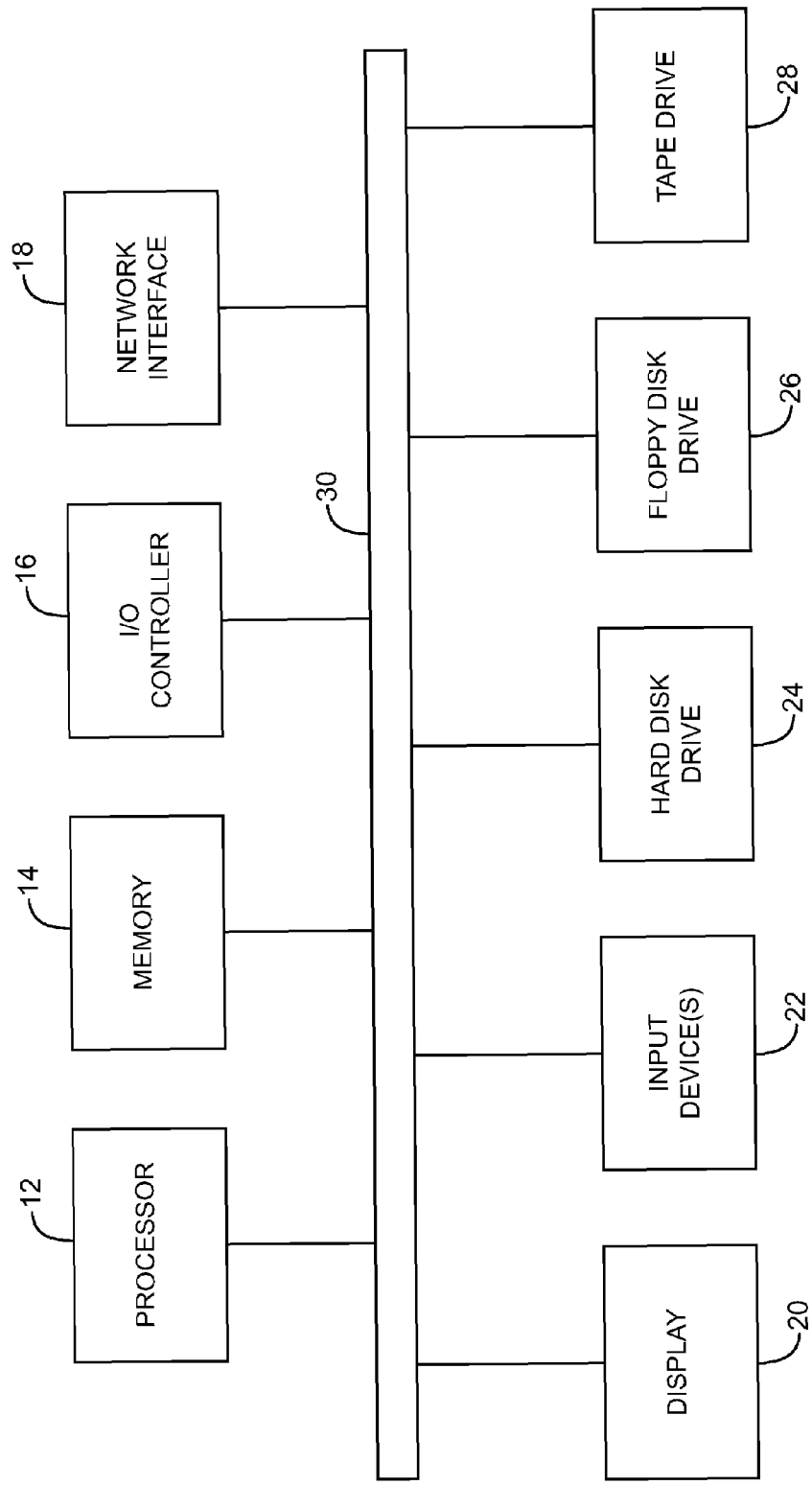
FIG. 1 is an illustration of a general-purpose computer system in which at least one embodiment of the invention can be embodied.

The drawings are not necessarily to scale, emphasis instead generally being placed upon illustrating the principles of the invention.

DETAILED DESCRIPTION

Systems and methods of the invention provide techniques for notifying a user about the operation of an uninterruptible power supply (UPS) that is connected to the system, including notifications relating to specific events, such as loss of primary power to the system or fluctuations in power level which can lead to the UPS transitioning to "on battery", changes in communication with the UPS (e.g., loss of communications and/or restoration of communications), problems with UPS current, voltage, power, or other parameters, and the like. In at least one embodiment of the invention, these notifications are provided, upon occurrence of a specific event, by displaying a user interface on the display screen of a computer accessible to a user, so that a user can receive information about the event and/or the UPS operation.

Using icons and graphics, the user interface can, in one embodiment, convey more "at a glance" information about the UPS than a conventional systray icon, although in at least some embodiments of the invention, the invention also includes a systray icon. Further, because the user interface, in at least one embodiment, does not require that the user launch a separate application, the user interface can be more likely to be viewed by the user. In at least one embodiment, the basic user interface does not take up a large portion of the display screen (e.g., takes up less than half of the display).

Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. In at least one embodiment, the systems and methods of the invention are implemented using software running on a general purpose computer system that is operably connected to a UPS device. In at least one embodiment, the systems and methods of the invention are implemented using software running on a general purpose computer system that is in operable communication with a UPS device, where the UPS device is operably connected to a different general purpose computer system.

Other configurations of the invention also are possible. In at least some embodiments, the systems and methods in accordance with the invention can be implemented using devices connected over a network. For example, in an embodiment, the invention is implemented at a server connected to a plurality of general-purpose computers, each computer connected to a respective UPS device. In another example, in an embodiment, the invention can be implemented in a system having a server connected to a plurality of general purpose computers, with one or more UPS devices connected to the system.

An example of a general-purpose computer system 10 usable with at least one embodiment of the present invention is illustrated in FIG. 1 and includes a central processor 12, associated memory 14 for storing programs and/or data, an input/output controller 16, a network interface 18, a display device 20, one or more input devices 22, a fixed or hard disk drive unit 24, a floppy disk drive unit 26, a tape drive unit 28, and a data bus 30 coupling these components to allow communication therebetween.

The central processor 12 can be any type of microprocessor, such as a PENTIUM processor, made by Intel of Santa Clara, Calif. The display device 20 can be any type of display, such as a liquid crystal display (LCD), cathode ray tube display (CRT), light emitting diode (LED), and the like, capable of displaying, in whole or in part, the outputs generated in accordance with the systems and methods of the invention. The input device 22 can be any type of device capable of providing the inputs described herein, such as keyboards, numeric keypads, touch screens, pointing devices, switches, styluses, and light pens. The network interface 18 can be any type of a device, card, adapter, or connector that provides the computer system 10 with network access to another computer or other device, such as a printer. In one embodiment of the present invention, the network interface 18 enables the computer system 10 to connect to a computer network such as the Internet.

Those skilled in the art will appreciate that computer systems embodying the present invention need not include every element shown in FIG. 1, and that equivalents to each of the elements are intended to be included within the spirit and scope of the invention. For example, the computer system 10 need not include the tape drive 28, and may include other types of drives, such as compact disk read-only memory (CD-ROM) drives. CD-ROM drives can, for example, be used to store some or all of the databases described herein.

In at least one embodiment of the invention, one or more computer programs define the operational capabilities of the computer system 10. These programs can be loaded into the computer system 10 in many ways, such as via the hard disk drive 24, the floppy disk drive 26, the tape drive 28, the network interface 18, or a computer usable medium having a computer-readable code embodied thereon. Alternatively, the programs can reside in a permanent memory portion (e.g., a read-only-memory (ROM)) chip) of the main memory 14. In another embodiment, the computer system 9 can include specially designed, dedicated, hard-wired electronic circuits that perform all functions described herein without the need for instructions from computer programs.

A representative type of computer system 10 usable with at least some embodiments of the invention is a personal computer that is x86-, PowerPC.RTM., PENTIUM-based, or RISC-based, that includes an operating system such as IBM.RTM, LINUX, OS/2.RTM. or MICROSOFT WINDOWS (made by Microsoft Corporation of Redmond, Washington) and that includes a Web browser, such as MICROSOFT INTERNET EXPLORER, NETSCAPE NAVIGATOR (made by Netscape Corporation, Mountain View, Calif.), having a Java Virtual Machine (JVM) and support for application plug-ins or helper applications.

In at least one embodiment of the invention, the computer system 10 is part of a client-server system, in which a client sends requests to a server and a server responds to requests from a client. That is, the computer system 10 can be either a client system or a server system. In one embodiment, the invention is implemented at the server side and receives and responds to requests from a client. The client can be any entity, such as a the computer system 10, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), an Internet appliance, a telephone, an electronic reader device, or any other such device connectable to the computer network.

The server can be any entity, such as the computer system 10, a computer platform, an adjunct to a computer or platform, or any component thereof, such as a program that can respond to requests from a client. Of course, a "client" can be broadly construed to mean one who requests or gets the file, and "server" can be broadly construed to be the entity that downloads the file. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In at least one embodiment, the present invention is embodied in one or more software applications running on the computer system 10. The software applications can be provided in many different ways, such as via a computer-readable program medium usable with the general-purpose computer system 10, via a data structure stored on a computer or a computer-readable program medium, or via an application programming interface (API). Those skilled in the art will appreciate that virtually any technique for running a software application on the computer system 10 is within the spirit and scope of the invention.

In at least one embodiment, the present invention is embodied in one or more software applications running on the computer system 10. The software applications can provided in many different ways, such as via a computer-readable program medium usable with the general-purpose computer system 10, via a data structure stored on a computer or a computer-readable program medium, or via an application programming interface (API). Those skilled in the art will appreciate that virtually any technique for running a software application on the computer system 10 is within the spirit and scope of the invention.

Before describing the systems and methods of the invention in detail, it is helpful to explain at least some of the UPS "events" that can occur in accordance with the invention. In at least one embodiment of the invention, an "event" represents a condition when a change occurs in the UPS and/or the software application that requires the attention of the user.

Representative examples of the types of events that can occur include:
- On-line to On battery transition,
- On battery to On-line transition
- Battery requires replacement (e.g., because it has failed a self-test)
- Timed (e.g., three-year) battery replacement reminder
- Battery disconnected/connected
- Data saving/hibernation threshold reached
- Shutdown started (not hibernation)
- Lost communications with UPS
- Gained communications with UPS
- Gained communications with UPS while on-battery
- No UPS present at startup
- User initiated self-test passed (through front panel on UPS or through software)
- Self-test failed
- UPS Overloaded
- UPS no longer overloaded
- Buy more runtime
- Charger failure To determine whether or not a given event requires a response from the user (and thus might require providing an onscreen user interface display), in at least one embodiment, the events are categorized as 'Informational', 'Action Related' and 'Smart' Events.

Action related events are those that require the user to react to a state of the UPS. Table 1 is a list of representative Action-Related events used in accordance with at least one embodiment of the invention.

TABLE 1

| Event | Event Description |
|---|---|
| Bad Battery | Following a self-test, the UPS may report that the battery needs to be replaced. The software application displays a dialog to the user informing the user of the situation and provides information relating to how a user may obtain a new battery, such as a link to a web site where the user, with Internet Access, can order a new battery from the UPS manufacturer. In some embodiments of the invention, this even includes an option allowing the user to be reminded at a later time, if the battery is still old, that the user has a "bad" battery (in the instance where the user did not order a new battery or replace the "bad" battery). If the dialog is due to be displayed because the user requested this and the bad battery property is not set, then the last battery replacement date (LBRD) is updated to the current date. |
| Data saving threshold reached | In at least one embodiment of the invention, when the data saving threshold is reached (data saving occurs, for example, when a UPS needs to shut down, wherein the software application reached works with the operating system to save application data), the notification dialog provides the user with the option to immediately start, without waiting for a ten second count down, or cancel application data saving. In the latter case, the user has to manually save files and shutdown the computer system or the computer system may have power cut from it without further warning. |
| Lost communications while on battery | When the UPS goes on battery and the software application is communicating with the UPS, the software application continues to monitor the UPS and performs a shutdown if the power outage is an extended one. However, if the software application is unable to communicate with the UPS, the battery may become depleted and the software application would have no way of knowing if the battery was depleted. Thus, the software application instigates a worksafe and shutdown as described in the previous "Data saving threshold reached" event whenever the UPS is on battery and the software application then loses communications with the UPS. For example, this event can be triggered a predetermined time after the loss of communication while on battery. |
| Hibernation threshold reached | When the hibernation threshold is reached, the notification dialog provides the user with the option to immediately start, without waiting for a timed count down, or cancel the hibernation process altogether. In the latter case, the user is warned that he or she must manually hibernate the system or the computer system may have power cut from it without further warning. |
| System about to Shutdown Shutdown Imminent | A notification dialog informs the user that the shutdown is in progress as soon as the Application Data Saving has completed. The UPS may go on battery when there is an extremely low amount of reserve remaining in the battery (e.g., <10%) and the computer system has just about enough time to shutdown successfully without performing application data saving. The user is given an option to cancel this shutdown but must manually shutdown the system or the computer system may have power cut from it without further warning. In some embodiments, this notification is also presented to users whose computer system does not facilitate hibernation. |
| Battery Disconnected | When the battery of the UPS is disconnected, the software application presents an event notification dialog to the user informing the user that the user's equipment is not protected. The user is advised as to how to rectify the situation by reconnecting the battery. |
| Battery Overloaded | When the UPS becomes overloaded, the software application displays an event notification dialog is informing the user that the user's computer system 10 is not protected in the event of a power problem. The user is recommended to remove equipment from the battery backed up sockets on the back of the UPS to remedy the situation. |

TABLE 1-continued

| Event | Event Description |
|---|---|
| Managed Shutdown | A notification dialog is presented to users where hibernation is not possible. It informs the user why the system was shutdown rather than hibernated and offers tips on how to make their systems facilitate hibernation. It also lets the user know the benefits of hibernation. |
| Charger failure | The UPS reports this event when it is determined (such as by firmware running on the UPS) that the charger of the UPS is no longer functioning. The software application displays a dialog is displayed telling the user that an internal fault has been detected in the UPS 50 that should be addressed as soon as possible. The user is advised to contact the UPS manufacturer about the issue if the UPS is within warranty and is advised about upgrade possibilities if the UPS is out of warranty. |

A Smart Event is an event that the software application 70 (see FIG. 2) reports to a user that makes a proactive recommendation to the user. A variety of UPS conditions can trigger "smart events". Table 2 is a table of representative "Smart events," in accordance with an embodiment of the invention.

TABLE 2

| Event | Event Description |
|---|---|
| System highly loaded | The software application 70 system presents the user with a notification dialog when the runtime available is below the level recommended by the UPS manufacturer (e.g., 5 minutes), such as when the load on the UPS 50 is between 80% and 100%. The user's UPS 50 may no longer be capable of protecting the user's computer system 10 fully. The software application 70, in at least one embodiment, attempts to provide a solution to this issue. For example, the software application 70 can provide a link, in the notification dialog, to the UPS manufacturer's website to allow the user to buy more runtime in the form of another UPS. The software application 70 can also advise the user that removing load from the battery backed up sockets might rectify the situation. When the user closes the dialog, the dialog does not re-appear until a predetermined time (e.g., one month) later. |
| Old battery | For a UPS 50 whose battery is older than the recommended lifespan (e.g., older than three years), the software application 70 displays an event notification dialog to alert the user to the need for purchasing a new battery. The notification dialog can include a link to a web site where the user can order a new battery. The notification dialog also may include an option to update the last battery replacement date ("LBRD") if the user is reminded at a later time and the user did actually replace the battery in the UPS. Even if the user does this without it being true, the bad battery event will catch the fact that the battery is old. |

Informational Events are those events that do not necessarily require user intervention. For example, an event such as when the UPS transitions from being on battery to online can be considered to be an informational event that does not require user intervention, although in some instances, the user may want to be informed that the transition has occurred. In contrast, in another example, some events, such as when the UPS transitions from being online to being on battery, are considered "important," because the software application and/or the user may want to react to the transition, such as by saving all opened files or by turning off an "on-battery alarm" that is presented. Table 3 is a table of representative "Informational Events," in accordance with an embodiment of the invention.

TABLE 3

| Event | Event Description |
|---|---|
| On-Line to On Battery transition | When the UPS transition from on-line to on-battery, such as when there is a loss of utility power, a 'balloon' notification is generated from the system tray application, informing the user that the user's UPS is now supplying battery power to their equipment. |
| On Battery to On-Line transition | When the UPS transitions from being on-battery to on-line, such as when utility power is restored, a 'balloon' notification is generated from the system tray application, informing the user that his/her equipment is now running on AC utility power. |
| Battery connected | When a UPS battery is re-connected, such as when the UPS battery is reconnected after the UPS battery has been previously disconnected, a 'balloon' notification is generated from the system tray application informing the user that the battery is re-connected in battery backup. |
| Lost Communications with UPS | When the software is unable to communicate with the UPS, a 'balloon' notification is generated from the system tray application informing the user that the user needs to check the connection between the PC and the UPS. |
| Gained Communications with UPS | When the software re-commences communicating with the UPS, a 'balloon' notification is generated from the system tray application informing the user that the software is now communicating with the UPS. |
| Gained Communications with UPS while On Battery | When the software re-commences communicating with the UPS and it is on-battery, a 'balloon' notification informing is generated from the system tray application the user that the software is now communicating with the UPS, which is on-battery. |
| No UPS present at startup | On startup, if the UPS is not connected to the PC a 'balloon' notification is generated from the system tray application informing the user that there is no UPS present. |
| Self-Test passed | When a self-test is initiated and passes, a 'balloon' notification is generated from the system tray application informing the user that the UPS self-test has passed. |
| UPS no longer overloaded | When a UPS battery is no longer overloaded, after it has been previously overloaded, a 'balloon' notification is generated from the system tray application informing the user that the battery no longer overloaded. |

Figure 2:
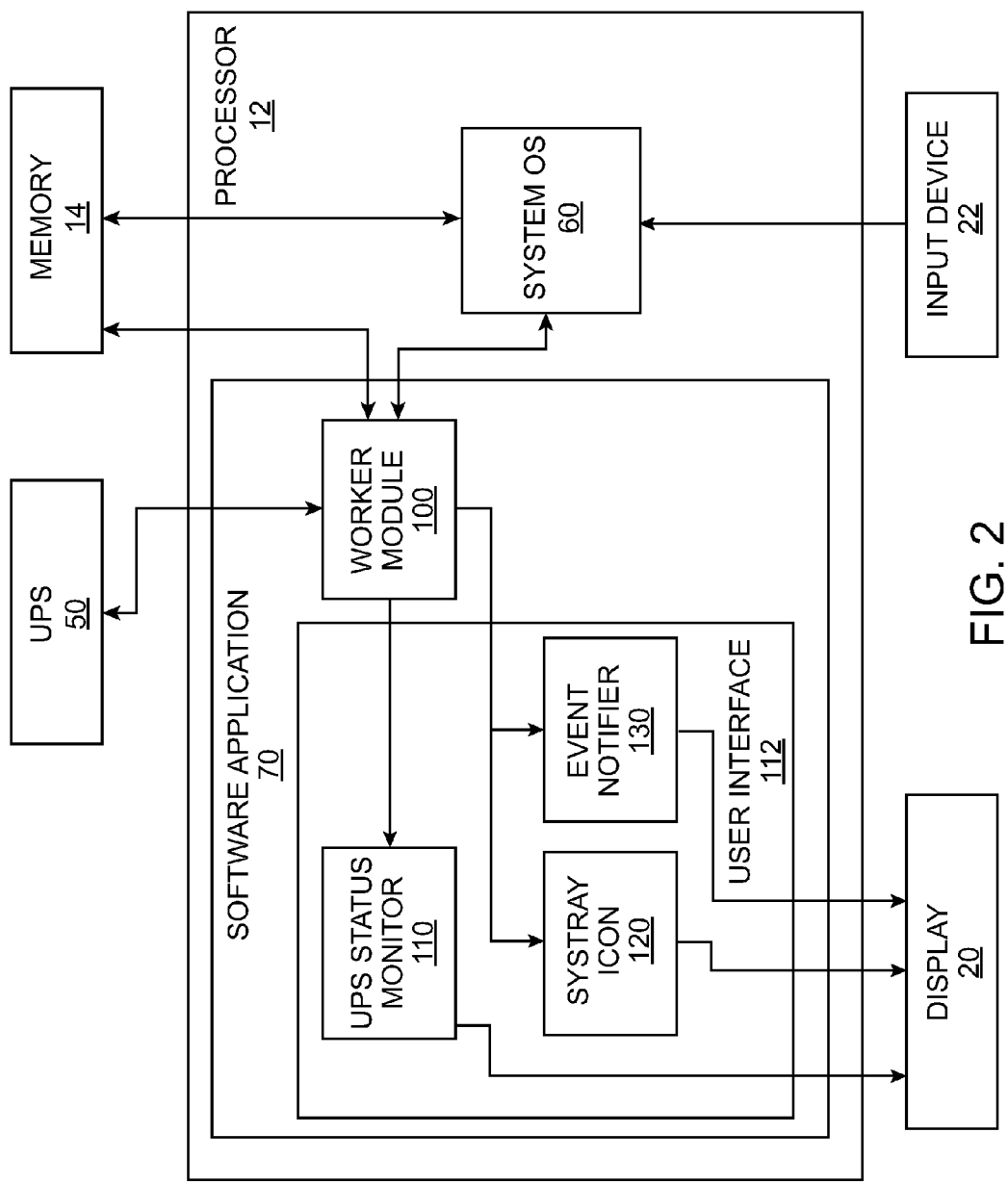
FIG. 2 is an illustration of a system implementing an embodiment of the invention.

Reference is made now to FIG. 2, which is a block diagram of an embodiment of the invention implemented on the computer system 10 of FIG. 1. The system of FIG. 2 is used with at least one uninterruptible power supply (UPS) 50, such as the BACK-UPS PRO with Universal Serial Bus (USB) family of devices, available from American Power Conversion (APC), Inc., of West Kingston, R.I. The UPS 50 need not necessarily be the backup power supply for the computer system 10 that is implementing the invention (that is, the computer system providing information about the UPS device need not be the device to which the UPS is acting as a backup power source). For example, in one embodiment, the UPS 50 can be coupled to a different device, such as a server or a general purpose computer (not shown), to which the UPS 50 serves as a backup power source, while the UPS 50 is at the same time connected to the computer system 10, so that the computer system 10 can be used to monitor the UPS 50.

Further, in another embodiment, the computer system 10 employing the invention can be connected to a plurality of UPS's 50 (any one or more of which supply backup power to one or more other powered devices), and the invention can be implemented and adapted so that the computer system 10 displays status information (such as the status information described herein) about any of the UPS's to which it is connected. Of course, in at least one embodiment, the UPS 50 is serving as a backup power source for at least the computer system 10 implementing the invention.

In FIG. 2, the invention is implemented as a software application 70 running on the computer system 10. Although the software application 70 is illustrated in FIG. 2 as being implemented on a single processor 12, those skilled in the art will appreciate that the more than one processor 12 can be used to implement the software application 70. For example, the functions of one or more of the modules within the software application 70 can be running on a first processor 12 while the remaining modules are running on one or more additional processors (not shown).

Referring again to FIG. 2, the software application 70 of at least one embodiment further comprises a worker module 100, UPS status monitor module 110, systray icon module 120, and event notifier 130 module, which together comprise a user interface module 112. A user interface 112 in accordance with the invention need not include the UPS status monitor 110, systray icon 120 (also referred to as "system tray icon 120"), and the event notifier 130; however, any one or more of the UPS status monitor 110, systray icon, and event notifier 130 can serve as a user interface 112. The functions and appearance of the user interface 112, UPS status monitor 110, systray icon 120, and the event notifier 130 are described more fully herein. The worker module 100 of the software application 70 determines the status (e.g., operating parameters) of the UPS 50 and the software application 70 notifies a user, via the user interface 112, when appropriate. The user interface 112 can, for example, be displayed to a user, such as by using the display 20. In accordance with one embodiment of the invention, the user interface 112 can further include other elements, such as icons, balloon notifications, symbols, links, and/or characters.

Figure 3:
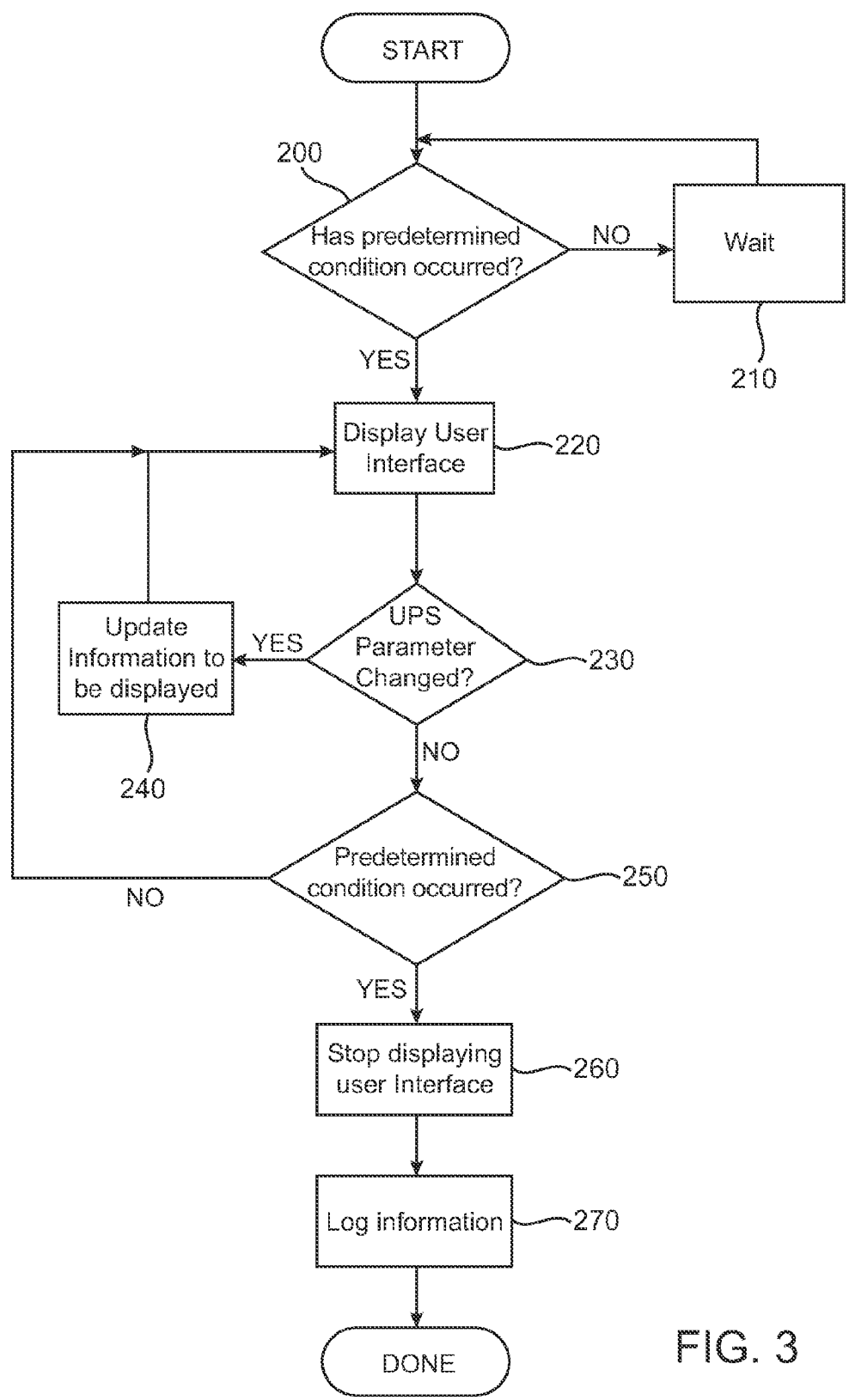
FIG. 3 is a flow chart illustrating a method for notifying a user about the occurrence of a predetermined event, in accordance with an embodiment of the invention.

FIG. 3 is a flow chart illustrating the operation of the system of FIG. 2, in accordance with an embodiment of the invention. If a predetermined event or condition occurs (step 200), the software application 70 displays a user interface 112 (such as the UPS status monitor 110, described more fully below) on the user's display. If no event occurs, the software application 70 waits (step 210) for events. The display of a user interface 112 of step 220, in at least some embodiments of the invention, can include displaying a balloon notification and/or a system tray icon 120, either instead of or in addition to the display of the UPS status monitor 110. As explained further herein, the balloon notification, in one embodiment, can arise from the display of the system tray icon. Operation of the UPS status monitor 110, event notifiers 130, balloon notification, and the system tray icon 120 are explained more fully below.

In at least one embodiment, the information displayed in the user interface 112 is context-sensitive and/or event-specific and relates to the predetermined condition and/or event. For example, if the UPS 50 is on battery, but there are no communications problems, the user interface 112 need not include communications status information.

When the user interface 112 is displayed (step 220), if any UPS parameter changes (step 230), then the user interface 112, in at least one embodiment, can be updated (step 240) to reflect the change. If the predetermined event continues, then the user interface 112 remains on the display (step 250). For example, if the user interface 112 is a UPS status monitor, then it is displayed for the duration of the predetermined event. In at least some embodiments of the invention, however, the user can take an action to hide the display of the user interface 112 even though the predetermined event is still continuing (although the steps associated with this action are not shown in FIG. 3, they will be understood by those skilled in the art).

When the predetermined event stops, the display of the user interface 112 stops (step 260). In at least some embodiments of the invention, information relating to the predetermined event is logged (step 270) (logging is explained more fully herein). Although FIG. 3 illustrates that the logging of information occurs after the display of the user interface 112 is stopped, that should not be viewed as limiting. Logging of information can occur at any desired time, including times when no predetermined event has occurred.

Referring again to FIG. 2, the software application 70 is, in at least one embodiment, user-interface based and is designed to function with the operating system 60 running on the computer system 10. Although the following embodiment of the invention is discussed in connection with WINDOWS as the operating system 60, the invention can, of course, be implemented for use with other operating systems.

Any one or more of the UPS status monitor 110, systray icon 120, and event notifier 130 can serve as a user interface 112, in accordance with the invention. When predetermined events (such as those described previously) occur relating to the UPS 50 and/or elements of the software application 70, the software application 70 presents the user with a "view" of information appropriate to the given predetermined event via the user interface 112 (e.g., UPS status monitor 110, systray icon 120, and/or event notifier 130) provided on the user's display 20. The way the software application 70 handles events depends on the type of the event. The event may trigger the need for the software application 70 to process the state change so that the user's computer system 10 is managed properly from a power protection point of view.

The UPS status monitor 110, in one embodiment, provides the ability, (e.g., via a "mute" button) to silence and/or turn off any UPS alarms currently sounding, such as when an "on-battery" UPS alarm is sounding. In at least one embodiment, this muting function only mutes the alarms that are sounding at the time the mute function is enabled, and the occurrence of another event that is associated with an alarm (e.g., one "on-battery" event) will sound the alarm again. Those skilled in the art will recognize that the UPS status monitor 110 of the invention may be adapted (e.g., have additional buttons) to permit the user to perform other functions, such as configuring the software application 70 and/or the UPS 50.

The notifications about the status of the UPS 50 can happen in many different ways. For example, in at least one embodiment, the UPS 50 has the ability to communicate information about itself (e.g., error conditions, self-test conditions, voltage and current levels, etc.) to the computer system 10, such as by messages sent from the UPS 50 to the computer system 10. In at least one embodiment, the computer system 10 monitors the UPS 50 to obtain status information about the UPS 50, such as by connecting to one or more circuits in the UPS 50 to monitor the conditions present on those circuits. In at least one embodiment, communication about the status of the UPS 50 is accomplished using a separate system, such as a hardware or software system (not shown), capable of monitoring the status of the UPS 50 and providing information about the status of the UPS to the computer system 10. Those skilled in the art will recognize that many other ways of monitoring the status of the UPS 50 and events associated with it may be used with embodiments of the invention.

Referring again to FIG. 2, the worker module 100 (which can be a service or a process) runs continually on the user's computer system 10 and monitors the status of the UPS 50 to ensure that the user's computer system 10 is protected at all times. The worker module 100 also obtains information relating to the UPS 50, such as UPS 50 operating parameter information. The worker module 100 also displays information on the activities of the software application 70 on reboot following an extended power outage. In addition, the worker module 100 constantly polls the UPS 50 and registers any loss of communication between the UPS 50 and the computer system 10. The worker module 100 continues to poll the UPS 50 after a loss of communication, until the situation is resolved.

The worker module 100 is able to determine that a predetermined event has occurred, such as an action related event (Table 1) or a smart event (Table 2). As explained below, the application functions associated with the system tray icon 120 and the software application 70 (including the user interface 112) can determine whether informational events (Table 3) have occurred (this can be done, for example, by polling the UPS). Upon the occurrence of a predetermined event, the worker module 100 provides at least a portion of the UPS operating parameter information to the UPS status monitor 110, the systray icon 130, and/or the event notifier 130, any one or more of which can, depending on the event, notify the user about the occurrence of the event. This operation is explained more fully herein.

The UPS status monitor 110 displays at least a portion of the information provided by the worker module 100 in a format such as graphical format, alphanumeric format, and/or textual format so that the user can determine the status of his or her UPS 50 at a glance and have access to more advanced features from it. The information can, in one embodiment, take the form of a user interface that includes graphical images and/or symbols (e.g., images representing batteries, charge indicators, plugs, computers, and the like, including images that also serve as links to other information) and/or non-graphical images and/or symbols (e.g., one or more characters such as letter, numbers, and control characters, words, phrases, mathematical symbols and equations, numbers representing timers, and the like, which may include one or more characters that also serve as links to other information).

As will be explained herein, the systray icon 120 and the event notifier 130 also can display at least a portion of the information that the worker module 100 provides and/or monitors. Any one or more of the UPS status monitor 110, the systray icon 120, balloon notifications, and the event notifier 130, can constitute a user interface 112, as used herein.

In at least one embodiment of the invention, the UPS status monitor 110 includes a display, sometimes referred to as a "dashboard." FIGS. 4A through 4D, which are discussed in greater detail herein, are illustrative examples of a UPS status monitor 110 during various states of the UPS 50, in accordance with an embodiment of the invention. The UPS status monitor 110 includes a window containing one or more indicators, such as alphanumeric characters, text and/or images, that represent UPS status data such as battery capacity, time to shutdown, on-line/on-battery status.

The images can, for example, include icons, symbols, graphics, pictures, drawings, images, signs, logos, photographs, cartoons, illustrations, diagrams, graphs, charts, tables, maps and other representations that are capable of visually conveying information about the UPS 50 and/or related information, such as links to data, manuals, or help files.

The alphanumeric characters and/or the text can, for example, include many different representations of UPS status data, such as letters, digits, control characters, space characters, and other special characters, along with combinations of letters, digits, and other characters.

The images can, for example, include images representing physical elements associated with the UPS and/or the computer system. For example, an image usable in at least some embodiments of the invention is an icon having the shape of a conventional plug and/or socket, to indicate the status of the "line current" powering a UPS. In one embodiment, the icon has a first appearance (e.g., a red color) to indicate that that there is a problem with the line current, and a second appearance (e.g., a green color) indicating that there are no problems with the line current. Another image usable in accordance with the invention is that of a button having a first appearance to indicate that the button has not been pressed and a second appearance to indicate that the button has been pressed. The first and second appearances of the button can, for example, have appropriate shading and/or shadows to mimic the appearance of a pressed button.

The images also can include alphanumeric characters and/or text indicators, where the alphanumeric character(s) and/or the text field briefly describe the current status of the UPS. For example, the text field "low charge" may be displayed to indicate that the UPS battery's charge is below a predetermined threshold and is "low." In another example, alphanumeric characters such as "Voltage:##.##" could be displayed to indicate a battery voltage that is out of the range of the device measuring it. Those skilled in the art will appreciate that many different characters and/or representations are usable in accordance with the invention.

The UPS status monitor 110 has two modes of operation, automatic and manual. In automatic mode, UPS status monitor 110 automatically appears (e.g., by "popping up" on the user's display screen) when predetermined events occur, such as when the UPS 50 goes on battery. When the UPS 50 goes on battery, for example, the UPS status monitor 110 provides graphical and non-graphical (e.g., alphanumeric and/or textual) information (e.g., indicators) on battery status, charge level and time remaining until shutdown. The UPS status monitor 110 disappears either when another predetermined event occurs (such as when the event that caused its display is resolved, e.g., when utility power is restored) or upon a predetermined input from the user. Thus, in at least one embodiment of the invention, during automatic mode, the UPS status monitor 110 appears only when needed (e.g., when information needs to be provided to the user).

In manual mode, the user can launch the UPS status monitor 110 from another part of the software application 70, such as the system tray icon 120. During manual mode, the information that the UPS status monitor 110 displays dynamically reflects the current status. For example, if the UPS status monitor 110 is opened under 'normal' conditions for the UPS 50 (e.g., when the battery of the UPS 50 is fully charged and utility power is being supplied to equipment), the display of the UPS status monitor 110 will not necessarily contain information that is not applicable under 'normal' conditions (e.g., the UPS status monitor 110 would not contain information such as the time remaining until shutdown). If the UPS status monitor 110 is manually launched, in this embodiment, it is closed manually.

In at least one embodiment, the UPS status monitor 110 includes controls that enable the user to take some action based on the current status of the UPS 50. The controls can be provided in many different ways, such as displaying them to the user as part of the UPS status monitor 110 that appears on a user's display screen, by having the controls appear or "pop up" when a user moves a pointing device or cursor over part of the UPS status monitor 110. For example, if the UPS 50 is supplying battery power and emitting an audible alarm, the UPS status monitor 110 can display a control that enables the user to mute the alarm (this is illustrated in FIG. 4C, discussed herein).

In at least one embodiment, the UPS status monitor 110 is sized so that it is small enough to be unobtrusive to the user during operation of the computer, yet not so small that a user can ignore the window, and not so large that it takes up so much display space that the user has an incentive to close it prematurely, missing valuable status information. The size of the UPS status monitor 110 can be important when the UPS status monitor 110 is running in automatic mode, because the UPS status monitor 110 may remain on the display for the duration of the event. It can be advantageous, therefore, to have the UPS status monitor 110 (or other user interface 112) take up a minimum amount of space on the display. For example, in an embodiment of the invention, the UPS status monitor 110 has the size of a toolbar, such as a toolbar in the shape of a row. The UPS status monitor 110 can, in one embodiment, be positioned anywhere on the display that is desired.

Figure 4A:
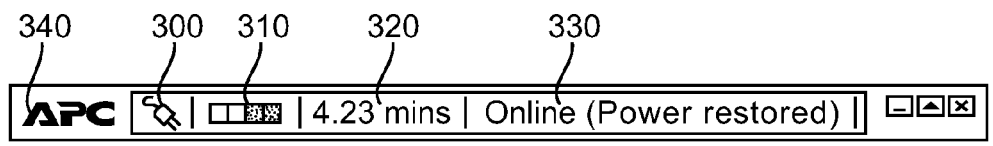
FIG. 4A is a first illustrative screen shot of a UPS status monitor, in accordance with an embodiment of the invention.
Figure 4B:
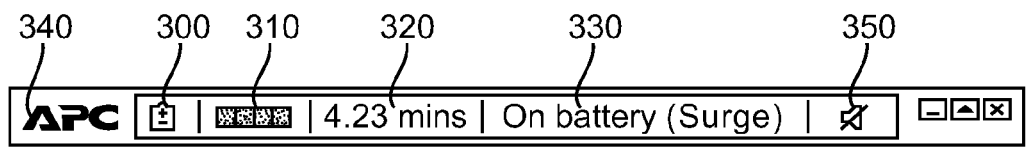
FIG. 4B is a second illustrative screen shot of a UPS status monitor, in accordance with an embodiment of the invention.
Figure 4C:
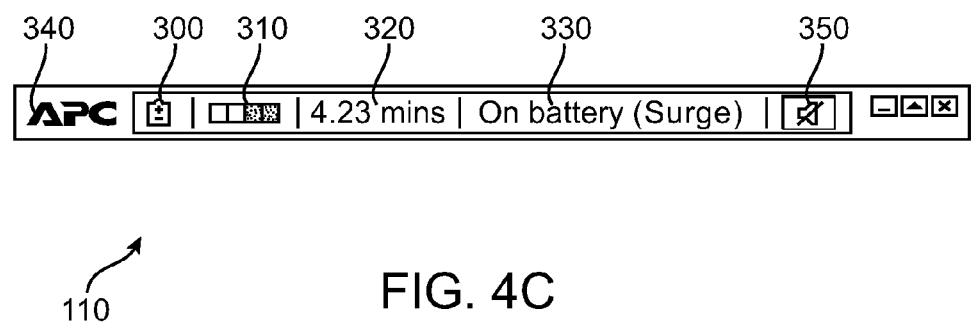
FIG. 4C is a third illustrative screen shot of a UPS status monitor, in accordance with an embodiment of the invention.

FIGS. 4A through 4D are representative illustrations of a UPS status monitor 110, in accordance with an embodiment of the invention. FIG. 4A is an illustrative screen shot of a UPS status monitor screen when the UPS 50 is an "on-line" status. In FIG. 4A, the UPS status monitor 110 includes four visible indicators: a line current indicator 300, a charge level indictor 310, a shutdown time indicator 320, and a UPS state indicator 330. The UPS status monitor 110 of FIG. 4A also includes a link 340 to the UPS manufacturer website (in at least one embodiment, this link is not required for the invention). This link 340 is shown for illustrative purposes only as "APC".

As the embodiment of FIG. 4A illustrates, the line current indicator 300 is illustrated as a "plug" symbol to indicate that the UPS is "on-line" (using line current). The UPS state indicator 330 also shows that the UPS is "on line" and further indicates the informational event that power was restored. The charge level indicator 310 includes a graphical symbol with several levels to indicate the level of charge of the battery in the UPS 50. In the example UPS status monitor 110 of FIG. 4B, two of the four charge levels are shaded white, indicating that the battery in the UPS 50 is at a 50% charge level. Of course, other ways of indicating a difference between adjacent symbols or text, such as shading changes, color changes, flashing graphical and/or non-graphical indicators, and the like, are usable in accordance with the invention. The shutdown time indicator 320 uses alphanumeric characters to indicate the shutdown time remaining. The indicators shown in FIG. 4A are merely representative of the types of indicators that may be used; those skilled in the art will appreciate that many different types and combinations of indicators are usable.

FIG. 4B is an illustrative screen shot of a UPS status monitor screen when the UPS 50 is in an "on-battery" state, with UPS alarms disabled. As FIG. 4B illustrates, the line current indicator 300 is illustrated as a "battery" symbol to indicate that the UPS is "on battery". The UPS state indicator 320 also indicates a condition of "on battery", with text that also indicates that a "surge" event has occurred. A portion 350 of the UPS status monitor 110, where a UPS alarm symbol would be displayed, is empty, indicating that the UPS alarm is disabled.

Figure 4D:
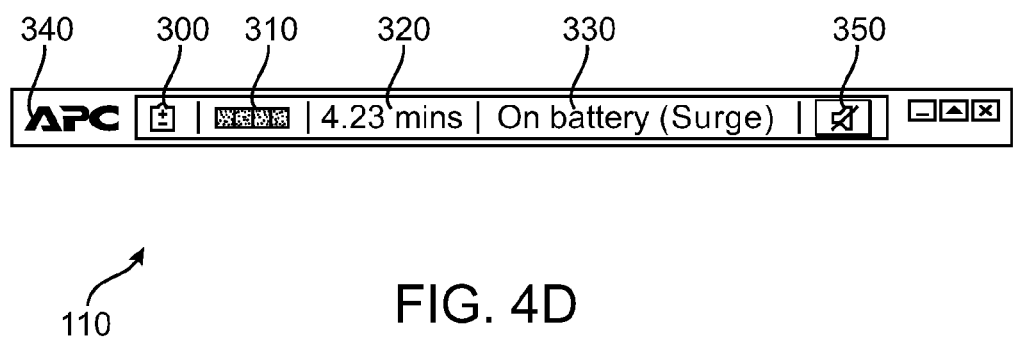
FIG. 4D is a fourth illustrative screen shot of a UPS status monitor, in accordance with an embodiment of the invention.

FIG. 4C is an illustrative screen shot of the UPS status monitor 110 when the UPS 50 is being monitored, is in an "on-battery" condition and UPS alarms are enabled. The UPS status monitor 110 of FIG. 4C includes an alarm indicator 350, which designates whether the UPS alarms are enabled or not. In the UPS status monitor 110 of FIG. 4C, the appearance of the alarm indicator 350 shows that UPS alarms are not being muted. In FIG. 4C, the alarm indicator 350 is a "button" type indicator that can be pressed to mute any alarms currently sounding. The alarm indicator 350 can be "clicked" to mute the current UPS alarm(s), if desired. FIG. 4D is an illustrative screen shot of the UPS status monitor 110 when the UPS 50 is in an "on battery" condition and the UPS alarms are muted. In FIG. 4D, the alarm indicator 350 is "indented" to indicate that the button has been pressed and that UPS alarms are muted.

Alarms can be muted in other ways, as well. For example, in one embodiment, the software application 70 and/or the system tray icon 120 can each include access to mute buttons for muting alarms. The system tray icon 120, for example, can be right or left clicked for a few seconds, to bring up a menu that includes a mute button. In another example, the UPS 50 may provide a control enabling a user to mute alarms.

Figure 5:
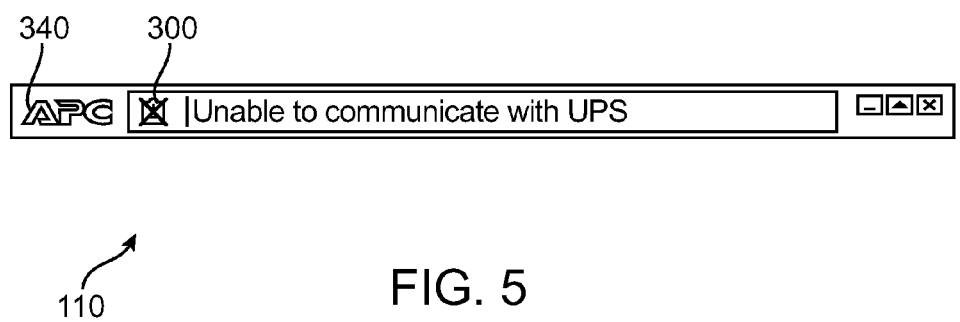
FIG. 5 is a fifth illustrative screen shot of a UPS status monitor, in accordance with an embodiment of the invention.

FIG. 5 is an illustrative screen shot of the UPS status monitor 110 during loss of communication with the UPS 50, in accordance with an embodiment of the invention. In FIG. 5, it can be seen that the line current indicator 300 has an "X" through it, indicating that the communication with the battery of the UPS 50 is not available.

Although this feature is not visible in the illustrated UPS status monitor 110 of FIGS. 4A-4D and FIG. 5, when a user moves a pointing device over the indicators in the UPS status monitor 110 (or other icons and/or alphanumeric characters/text in the UPS status monitor 110), "hover over" type alphanumeric/text descriptions can be displayed (e.g. "popped up"), as required, to explain what the indicator means and/or to provide a preview of what action may occur if a user "clicks" on the indicator. Another advantage that hover over text may provide is that it is not intrusive to the user—it appears as required by the user, to provide additional information. Hover over pop-up messages are understood by those skilled in the art.

In at least one embodiment, the UPS status monitor 110 is updated graphically and/or textually and/or by updating alphanumeric characters, to represent changes in parameters of the UPS 50 as they occur. This can be done in automatic mode, manual mode, or both, and, in at least one embodiment, the same actions and events are applicable regardless of the mode. For example, if the UPS status monitor 110 is displaying graphical symbols indicative of a 75% charge level (e.g., the charge level indicator 310 of FIGS. 4A through 4D has three of the four blocks shaded so as to indicate charge level), and the charge level then drops to 50%, the UPS status monitor 110 updates the graphical symbols (e.g., the charge level indicator of FIG. 4) that it displays to reflect the changes in the parameter of the UPS 50. In another example, if there is a loss of communications between the computer system 10 and the UPS 50, the UPS status monitor 110 is updated graphically to represent the loss of communications. FIG. 5, for example, is a representative illustration of a UPS status monitor 110 showing graphics and text illustrating the loss of communications. Based on what is displayed by the UPS status monitor 110, a user can take action in response to the displayed information about the UPS 50.

Referring to FIGS. 2, 3, and 4A-4D, and 5, as an example of the operation of the UPS status monitor 110, when an "on-battery event" occurs, the UPS status monitor 110 indicates, by showing a battery icon and a text message, that the UPS is "on battery". If the user requires more information about the computer system 10, the UPS status monitor 110 and/or the UPS 50, such as how much time is left to shutdown, the user can access this information via the UPS status monitor 110. As seen in the representation of the UPS status monitor 110 shown in FIGS. 4A through 4D, the user can mute the current on-battery alarm from within the UPS status monitor 110. In addition, in at least one embodiment of the invention, the indicators (and/or other icons and/or text ) displayed in the UPS status monitor 110 are context-sensitive (e.g., event-sensitive, state sensitive, status sensitive, etc.), and are displayed where relevant. For example, in one embodiment, if the status of the UPS 50 is "on-line", the UPS status monitor 110 does not necessarily display information on runtime remaining.

Referring again to FIG. 2, at least some embodiments of the invention include a systray icon 120. The systray icon 120 is a component that displays a system tray icon on a user's display 20 that provides basic UPS information "at a glance." For example, the system tray icon 120 can indicate states such as on-battery and on-line, loss of communications, restoration of communications, problems, and the like. The system tray icon 120 can, in some embodiments, provide other features, as well. For example, the system tray icon 120 can provide basic data about the UPS 50 through the use of a "tool tip", which is displayed when the cursor passes over the system tray UPS icon. The tool tip presents the user with a brief description of the current status of the UPS 50 and the software application 70 (such as when alarms may be configured to be muted). The system tray icon 120 also provides a "Balloon" Notification for events that are identified as "informational" events (see further information below), such as those events occurring where the UPS status monitor 110 is not already displayed.

Another feature that the system tray icon 120 provides, in at least one embodiment of the invention, is a menu option, which is accessible by right clicking on the system tray icon 120. This menu can include options such as Show/Hide the UPS status monitor 110, Launch (for launching an application), and muting alarms.

The Launch option launches another application, such as an application in operable communication with the software application 70, or a particular page of the application, i.e. provide a list of shortcuts to specific areas of the main application. For example, the application launching can produce shortcuts to screens providing information such as UPS Performance Summary, Current Status, Configuration top-level screen (providing access to Notification, Sensitivity, Runtime Settings and Advanced Voltage Setting), and Troubleshooting.

Figure 6:
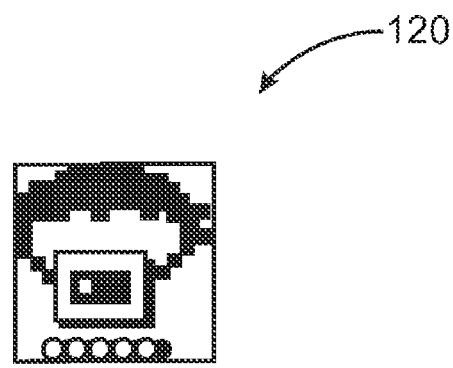
FIG. 6 is a first illustrative screen shot of a system tray icon, in accordance with an embodiment of the invention.
Figure 7:
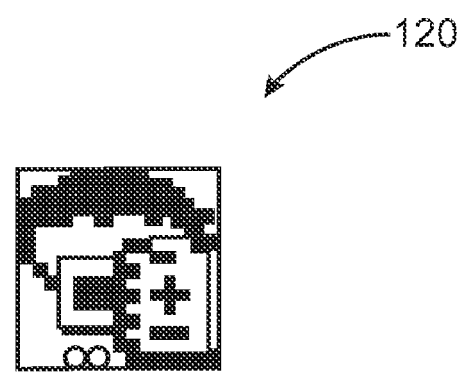
FIG. 7 is a second illustrative screen shot of a system tray icon, in accordance with an embodiment of the invention.

The systray icon 120 itself can, in one embodiment, include icons capable of representing different states of the UPS 50, such as "on-battery," "on-line", and "problem" (such as when the computer system 10 cannot communicate with the UPS 50, battery disconnected, charger failure, bad battery, etc). For example, FIG. 6 is a representative illustration of a system tray icon showing normal online operation. As FIG. 6 illustrates, the icon displaying an image of a computer, by itself, indicates that the UPS 50 is on-line (e.g., running from conventional wall current.). FIG. 7 is a representative illustration of system tray icon showing "on-battery" operation. As FIG. 7 illustrates, the "battery" icon overlayed on top of the computer icon indicates that the UPS 50 is running from its battery.

Figure 8:
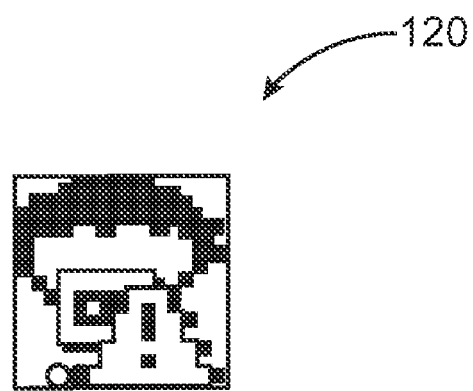
FIG. 8 is a representative illustration of a system tray icon showing loss of communication with the UPS, in accordance with an embodiment of the invention.
Figure 9:
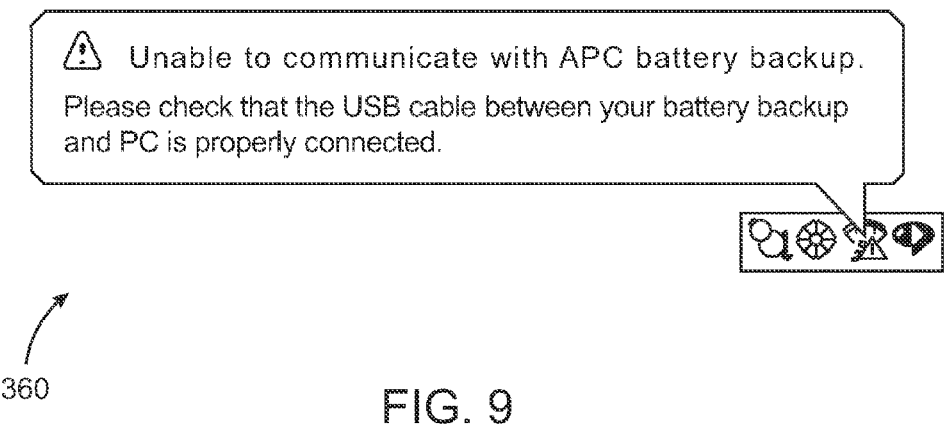
FIG. 9 is a representative illustration of a balloon notification originating from a system tray icon, in accordance with an embodiment of the invention.

In at least some embodiments of the invention, parts of the systray icon 120 provide functions such as giving test results. For example, if a user initiates a self-test of the UPS 50 (such as by pressing a "self test" button on the front of the UPS 50), when the self-test is complete, the system tray icon 120 displays a balloon notification telling the user the results of the UPS self-test. In another example, if communication between the UPS 50 and the computer system 10 is lost, a icon representing 'Lost Communication' is displayed in the system tray (see, e.g., FIG. 8) and a 'Lost Communication' balloon notification message 360, originating from the system tray icon 120, is presented to the user. FIG. 8 is a representative example of a system tray icon 120 showing a lost communication status, and FIG. 9 is a representative illustration of a balloon notification message 360, displayed from the system tray icon 120, when communication is lost.

In at least some embodiments of the invention, parts of the software application 70 can track information about the events that occur, to provide further information to a user and/or to the manufacturer(s) of the UPS 50 and/or the software application 70. For example, in at least one embodiment of the invention, the event notifier 130 also provides information for an event log. The worker module 100 maintains a log of all events generated by the UPS 50 as well some events associated with the software application. The event log includes the date, time and description of the event.

Figure 10:
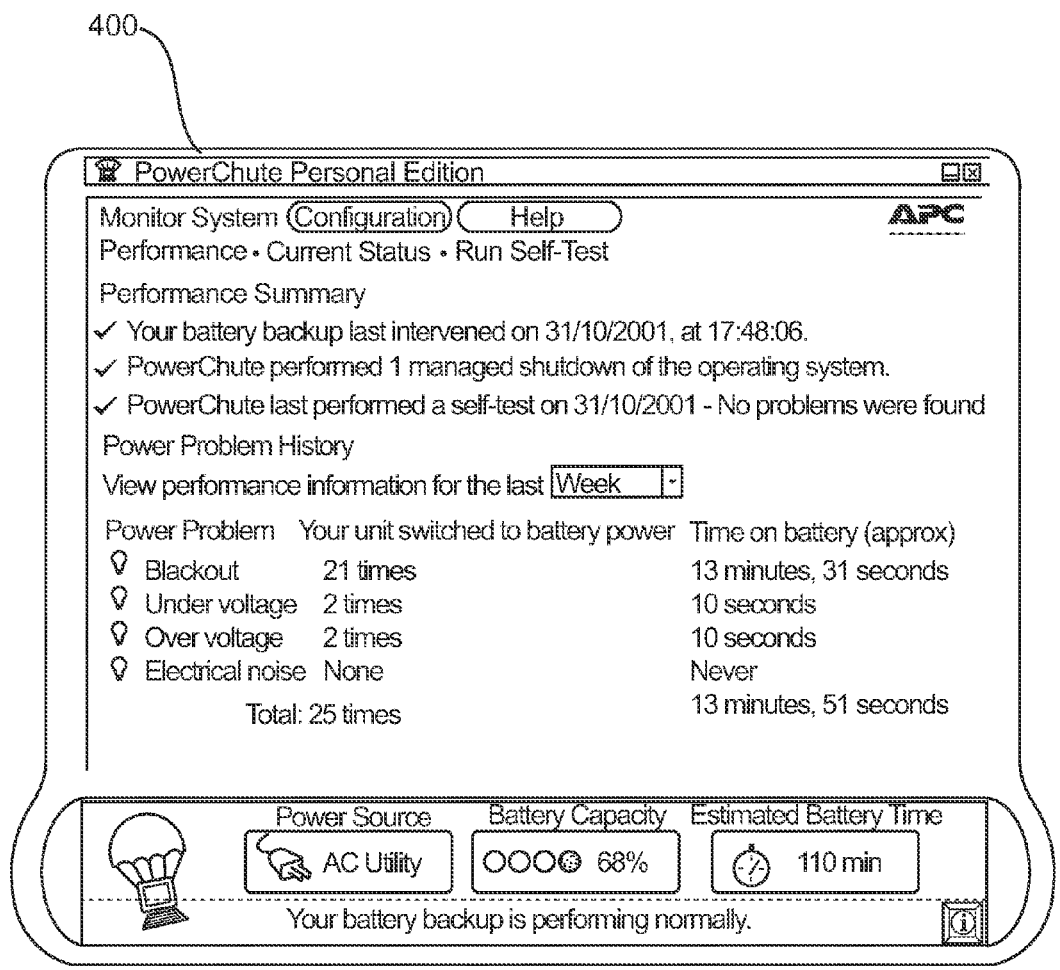
FIG. 10 is a representative illustration of a UPS performance summary screen, in accordance with an embodiment of the invention.

The events that are logged are used to generate information and reports about the performance of the UPS 50 and can be used for other aspects of the software application 70. Representative examples of events that can be logged include blackout, undervoltage, overvoltage, sensitivity fluctuation, self-test with result, worksafe condition, shutdown, hibernation, and online (the latter can be used to determine how long the UPS 50 was on battery due to a power event). FIG. 10 is an illustrative representative screen shot illustrating a performance summary report 400 based on events that the software application 70 logged over a time period.

As those skilled in the art will recognize, the invention described herein can be modified to accommodate and/or comply with any one or more of the above-described technologies and standards. In addition, variations, modifications, and other implementations of what is described herein can occur to those of ordinary skill in the art without departing from the spirit and the scope of the invention as claimed. Further, virtually any aspect of the embodiments of the invention described herein can be implemented using software, hardware, or in a combination of hardware and software. In addition, at least some embodiments of the invention described herein can be implemented using one or more computer-readable and/or computer-usable program modules, which modules can be embodied in tangible media (e.g., disks, CD-ROMs, DVDs (digital video disks), and hard drives) with information downloaded from a computer network such as the Internet.

At least some embodiments of the invention can be incorporated into many different types of UPS software systems, UPS device monitoring systems, and UPS management systems, including systems that manage and/or monitor networks of computers and/or networks of UPS devices. Examples of such systems include those described in U.S. Utility patent application Ser. Nos. 09/812,665 and 09/812,657, both filed Mar. 20, 2001 and entitled, respectively, "Power Supply Event Notification System," and "Power Supply Critical State Monitoring System,", as well as those described in commonly assigned U.S. Utility patent application Ser. No. 09/927,822 entitled "Uninterruptible Power Supply (UPS) Devices Monitoring System," filed Aug. 10, 2001. The contents of these applications are hereby incorporated by reference in their entirety. In addition, although the UPS monitoring system herein described as providing backup power supply to a computer system, the UPS monitoring system can be adapted to provide a backup power supply to many different types of powered devices.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose. In addition, it should be understood that, in the figures of this application, in some instances, a plurality of system elements or method steps may be shown as illustrative of a particular system element, and a single system element or method step may be shown as illustrative of a plurality of a particular systems elements or method steps. Showing a plurality of a particular element or step does not imply that a system or method implemented in accordance with the invention must comprise more than one of that element or step, nor does illustrating a single element or step limit the invention to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

It also should be noted that the previous representative illustrations, icons, and screen shots, together with the accompanying descriptions, are provided by way of example only and are not limiting. Those skilled in the art will recognize that many different designs of interfaces, icons, screen shots, navigation patterns, and the like, are within the spirit and scope of the invention.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention as hereinafter claimed.

The invention claimed is:

1. A system for providing information about the occurrence of at least one predetermined event associated with a single uninterruptible power supply (UPS) in operable communication with the system, the system comprising:
a processor in operable communication with the single UPS;
a worker module coupled to the processor and configured to determine whether the predetermined event has occurred at the single UPS; and
a user interface module responsive to the determination of the worker module, the user interface module configured to automatically generate a first user interface portion providing information relating to the predetermined event, the first user interface portion comprising at least one of a graphical portion and an alphanumerical portion, the first user interface portion concurrently providing multiple pieces of information regarding multiple characteristics of at least one of operation of the single UPS and connectivity of the system with the single UPS, wherein the first user interface portion has a size substantially similar to a size of a toolbar, the user interface module being further configured to automatically generate a second user interface portion providing historical power event information associated with the single UPS;
wherein the first and second user interface portions together occupy substantially an entire display window;
wherein the user interface module generates the first user interface portion and causes the first user interface portion to be displayed automatically upon occurrence of the predetermined event; and
wherein the multiple characteristics are at least two of battery capacity, time to shutdown, or on-line/on-battery status.

2. The system of claim 1, wherein the single UPS has at least one operating parameter and wherein the information relating to the predetermined event comprises information relating to the at least one operating parameter of the single UPS.

3. The system of claim 1, wherein the predetermined event has a duration and wherein the user interface module generates the first user interface portion for at least the duration of the predetermined event.

4. The system of claim 3 wherein the predetermined event is an event relating to UPS communication status.

5. The system of claim 3 wherein the predetermined event is an event relating to UPS battery status.

6. The system of claim 1 wherein the first user interface portion comprises at least one of a UPS status monitor, a system tray icon, an event notifier, and a balloon notifier.

7. The system of claim 1, further comprising a memory storing information relating to at least one of the predetermined event and an operating parameter of the single UPS.

8. The system of claim 7 wherein the first user interface portion further comprises a control that enables a user to perform a function based on the information in the first user interface portion.

9. The system of claim 8 wherein the worker module is configured to monitor the operating parameter of the single UPS and the user interface module is configured to dynamically update at least a portion of the first user interface-portion to reflect a change in the operating parameter.

10. The system of claim 9, wherein the worker module is configured to receive information from the single UPS relating to an operating parameter of the single UPS.

11. The system of claim 10, wherein the first user interface portion provides context-sensitive information relating to an operating parameter of the single UPS.

12. The system of claim 11, wherein the user interface module is configured to generate the first user interface portion upon receipt of a command.

13. The system of claim 1 wherein the first user interface portion is configured to be visually distinct from adjoining portions of a display.

14. The system of claim 1 wherein the first user interface portion has a width and a height substantially similar to a width and a height of the toolbar.

15. The system of claim 1 wherein the first user interface portion includes first and second selectable portions and wherein the user interface module is configured to respond to selection of the first selectable portion to change the first user interface portion to increase its size and information content and to respond to the selection of the second selectable portion to change the first user interface portion to a toolbar icon.

16. The system of claim 1 wherein the user interface module is configured to cause the first user interface portion to be displayed on a display and to be sized and disposed on the display to be substantially unobtrusive to a user of the display.

17. A method for providing a notification about the operation of a single uninterruptible power supply (UPS) connected to a computer system, comprising:
determining, with a processor in operable communication with the single UPS, that a first condition relating to the single UPS has occurred;
automatically generating and causing to be displayed, upon the occurrence of the first condition, a first user interface portion providing information relating to the first condition and having an indicator capable of conveying UPS information, the indicator comprising at least one of a graphical image and a character image, the first user interface portion indicator concurrently providing multiple pieces of information regarding multiple characteristics of at least one of operation of the single UPS and connectivity of the system with the single UPS, the first user interface portion indicator having a size substantially similar to a size of a toolbar, wherein the multiple characteristics are at least two of battery capacity, time to shutdown, or on-line/on-battery status; and automatically generating a second user interface portion providing historical power event information associated with the single UPS, wherein the first and second user interface portions together occupy substantially an entire display window.

18. The method of claim 17, wherein the first condition comprises at least one of a condition related to communications status with the single UPS, a condition related to UPS battery operation, and a first received command.

19. The method of claim 18 further comprising ceasing to display the indicator upon occurrence of a second condition.

20. The method of claim 19 wherein the second condition comprises a condition selected from the group consisting of receiving a second command, cessation of the first condition, and change in the first condition.

21. The method of claim 19 further comprising storing information relating to at least one of the first and second conditions.

22. The method of claim 21 further comprising displaying the stored information.

23. The method of claim 17 wherein the first user interface portion comprises at least one indicator conveying only information related to the first condition.

24. The method of claim 23, further comprising updating the indicator if the information relating to the first condition changes.

25. The method of claim 17 further comprising displaying a control enabling a function to be performed based on the first condition.

26. A method for providing a user, when an event occurs, with information relating to the operation of a single uninterruptible power supply (UPS), the UPS having an operational status, the method comprising:

determining, with a processor in operable communication with the single UPS, that an event has occurred;

automatically displaying a first user interface portion providing event-specific information about the operational status of the single UPS relating to the event, the first user interface portion comprising at least one of a graphical indicator and a non-graphical indicator, the first user interface portion concurrently providing multiple pieces of information regarding multiple characteristics of at least one of operation of the single UPS and connectivity of the system with the single UPS, the first user interface portion having a size substantially similar to a size of a toolbar, wherein the multiple characteristics are at least two of battery capacity, time to shutdown, or on-line/on-battery status;

automatically generating a second user interface portion providing historical power event information associated the single UPS, wherein the first and second user interface portions together occupy substantially an entire display window; and updating the displayed operational status information if the information related to the operational status of the single UPS changes during the time that the event is occurring;

wherein automatically displaying the first user interface portion occurs in response to the event occurring.

27. The method of claim 26 wherein the event has a duration and further comprising providing an alarm to the user during the duration of the event, the alarm notifying the user that the event has occurred.

28. The method of claim 27 further comprising displaying a control in the first user interface portion that enables the alarm to be muted.

29. The method of claim 28 further comprising ceasing to display the first user interface portion when the event is no longer occurring.

30. A system for notifying a user about the occurrence of at least one predetermined event associated with the operation of a single uninterruptible power supply (UPS), the predetermined event having a duration, comprising:

means for determining when the predetermined event has occurred, the determining means including a processor in operable communication with the single UPS;

means for automatically generating and displaying a first user interface portion when the predetermined event occurs, the first user interface portion providing information about the single UPS during at least the duration of the predetermined event and comprising at least one of a graphical image and a textual image, the user interface concurrently providing multiple pieces of information regarding multiple characteristics of at least one of operation of the single UPS and connectivity of the system with the single UPS, the first user interface portion having a size of about a size of a toolbar, the first user interface portion having a size substantially similar to a size of a toolbar, wherein the multiple characteristics are at least two of battery capacity, time to shutdown, or on-line/on-battery status; and means for automatically generating a second user interface portion providing historical power event information associated with the single UPS, wherein the first and second user interface portions together occupy substantially an entire display window.

31. The system of claim 30 further comprising means for controlling a function related to the information that is displayed.

32. The system of claim 30 further comprising means for determining the duration of the predetermined event.

33. A computer program product residing on a computer readable medium for providing information about the status of a single uninterruptible power supply (UPS) during an event, the single UPS having at least one operational parameter, the computer program product comprising computer-readable instructions that will cause a computer to:

determine, with a processor in operable communication with the single UPS, that the event has occurred;

automatically generate and cause to be displayed, upon occurrence of the event, a first user interface portion conveying information about the single UPS operational parameter relating to the event, the first user interface portion comprising at least one of a graphical indicator and an alphanumeric indicator, the first user interface portion concurrently providing multiple pieces of information regarding multiple characteristics of at least one of operation of the single UPS and connectivity of the system with the single UPS, the first user interface portion having a size substantially similar to a size of a toolbar, wherein the multiple characteristics are at least two of battery capacity, time to shutdown, or on-line/on-battery status; and automatically generate and cause to be displayed a second user interface portion providing historical power event information associated with the single UPS, wherein the first and second user interface portions together occupy substantially an entire display window.

34. The computer program product of claim 33, further comprising instructions for causing the computer to update the displayed first user interface portion if the single UPS operational parameter changes.

35. The computer program product of claim 34, further comprising instructions for causing the computer to generate the first user interface portion if the event is no longer occurring.

* * * * *